(12) United States Patent
Singh et al.

(10) Patent No.: US 11,612,108 B2
(45) Date of Patent: Mar. 28, 2023

(54) HYDRAULIC SYSTEM FOR AGRICULTURAL BALER

(71) Applicant: CNH Industrial America LLC, New Holland, PA (US)

(72) Inventors: Chandrashekhar Singh, Lancaster, PA (US); Carl Brewer, Ephrata, PA (US); Gregory T. Fasick, Hatfield, PA (US); John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 622 days.

(21) Appl. No.: 16/714,931

(22) Filed: Dec. 16, 2019

(65) Prior Publication Data

US 2021/0176921 A1 Jun. 17, 2021

(51) Int. Cl.
*A01F 15/08* (2006.01)
*A01F 15/10* (2006.01)
*F16H 61/4052* (2010.01)
*F16H 61/4035* (2010.01)

(52) U.S. Cl.
CPC ........ *A01F 15/085* (2013.01); *A01F 15/0841* (2013.01); *A01F 15/10* (2013.01); *F16H 61/4035* (2013.01); *F16H 61/4052* (2013.01)

(58) Field of Classification Search
CPC ........ A01F 15/10; A01F 15/106; A01F 15/08; A01F 15/085; A01F 15/0841; A01F 15/0825; A01F 15/0883; F16H 61/4032; F16H 61/4052
See application file for complete search history.

(56) References Cited

U.S. PATENT DOCUMENTS

| | | | |
|---|---|---|---|
| 3,462,925 A | 8/1969 | Lanier | |
| 5,191,753 A | 3/1993 | Fachini et al. | |
| 6,494,025 B1 | 12/2002 | Killen et al. | |
| 6,971,225 B1* | 12/2005 | Kempf | A01D 57/20 |
| | | | 56/398 |
| 7,805,914 B2 | 10/2010 | Smith | |
| 2011/0023732 A1* | 2/2011 | Herron | A01F 29/04 |
| | | | 100/78 |
| 2013/0167498 A1* | 7/2013 | Haycocks | A01F 15/08 |
| | | | 56/341 |
| 2016/0316618 A1 | 11/2016 | Fulton et al. | |

* cited by examiner

*Primary Examiner* — Jimmy T Nguyen
(74) *Attorney, Agent, or Firm* — Peter Zacharias; Patrick Sheldrake

(57) ABSTRACT

An agricultural baler towable by a vehicle that includes a frame and a baler hydraulic system. The baler hydraulic system includes a plurality of hydraulically operated subsystems, a plurality of hydraulic subsystem lines being fluidly connected to the plurality of hydraulically operated subsystems, and a hydraulic manifold fluidly connected to the plurality of hydraulic subsystem lines and configured for connecting to the vehicle hydraulic system. The agricultural baler also includes an electrical processing circuit operably connected to the hydraulic manifold and configured for switching the hydraulic manifold for connecting at least one hydraulic subsystem line of the plurality of hydraulic subsystem lines to the vehicle hydraulic system.

12 Claims, 6 Drawing Sheets

FIG. 4

| # | Description Hydraforce Solenoid Item Name: | Pressurized Port = "X" Remote 1 T1A 267 | Remote 1 T1B | Remote 2 T2A 265 | Remote 2 T2B 266 | Energized Solenoid = "X" Knife Tray 1 262 | Drop Flr (2X) 261 | Knife Tray 2 263 | PU Lift 264 | 4-Way 267, 266, 265 |
|---|---|---|---|---|---|---|---|---|---|---|
| 1 | a. Lower PU | X | | | | | | | | |
| 1 | b. Raise PU | | X | | | | | | | |
| 2 | a. Open Drop Floor | X | | | | | X | | X | |
| 2 | b. Close Drop Floor | | X | | | | | | X | |
| 3 | a. Disengage Knife Tray 1 | X | | | | X | | | X | |
| 3 | b. Engage Knife Tray 1 | | X | | | | | | | |
| 4 | a. Disengage Knife Tray 2 | X | | | | | | X | X | |
| 4 | b. Engage Knife Tray 2 | | X | | | | | | | |
| 5 | a. Open Drop Floor & Disengage Knife Trays 1 & 2 | X | | | | X | X | X | X | |
| 5 | b. Close Drop Floor & Engage Knife Trays 1 & 2 | | X | | | | | | | |
| 6 | a. Open Drop Floor & Disengage Knife Tray 1 | X | | | | X | X | | X | |
| 6 | b. Close Drop Floor & Engage Knife Tray 1 | | X | | | | | | | |
| 7 | a. Open Drop Floor & Disengage Knife Tray 2 | X | | | | | X | X | X | |
| 7 | b. Close Drop Floor & Engage Knife Tray 2 | | X | | | | | | | |
| 8 | a. Close Tail Gate & Disengage Knife Trays 1 & 2 | | | X | | X | | X | X | X |
| 8 | b. Open Tail Gate & Engage Knife Trays 1 & 2 | | | | X | | | | | |
| 9 | a. Close Tail Gate & Disengage Knife Tray 1 | | | X | | X | | | X | X |
| 9 | b. Open Tail Gate & Engage Knife Tray 1 | | | | X | | | | | |
| 10 | a. Close Tail Gate & Disengage Knife Tray 2 | | | X | | | | X | X | X |
| 10 | b. Open Tail Gate & Engage Knife Tray 2 | | | | X | | | | | |
| 11 | a. Close Tail Gate | | | X | | | | | | |
| 11 | b. Open Tail Gate | | | | | | | | | |
| 12 | Service Mode | | Float | | Float | X | X | X | | X |
| 13 | Road Mode | | | | | | | | X | |

HYDRAULIC SYSTEM FOR AGRICULTURAL BALER

BACKGROUND OF THE INVENTION

The present invention pertains to agricultural balers and, more specifically, to a hydraulic system for an agricultural baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

Typically, the hydraulic system of the round baler is coupled with the hydraulic system of the towing vehicle, for example a tractor. For instance, each hydraulically operated function of the baler may have a designated hydraulic line which couples with the hydraulic system of the tractor. In modern balers, there are five different hydraulic lines, including a drop floor line, a pair of knife tray lines, a pickup unit line, and a tail gate line. However, since most modern tractors only include four hydraulic ports for coupling with the five hydraulic lines of the baler, only four systems may function at a time. Hence, to achieve a desired set of baler functions, the operator must generally step out of the tractor and manually switch the hydraulic lines as needed. The task of switching hydraulic lines can be time-consuming and inconvenient. Furthermore, existing hydraulic systems may be complex and inefficient since each hydraulically operated function of the baler has its own, independent hydraulic line.

What is needed in the art is a streamlined hydraulic system for an agricultural baler.

SUMMARY OF THE INVENTION

In one exemplary embodiment formed in accordance with the present invention, there is provided a baler hydraulic system and an electrical processing circuit. The baler hydraulic system includes a plurality of hydraulically operated subsystems, a plurality of hydraulic subsystem lines being fluidly connected to the plurality of hydraulically operated subsystems, and a hydraulic manifold fluidly connected to the plurality of hydraulic subsystem lines and configured for connecting to the vehicle hydraulic system. The electrical processing circuit is operably connected to the hydraulic manifold. The electrical processing circuit switches the various valves within the hydraulic manifold for connecting at least one hydraulic subsystem line to the vehicle hydraulic system to perform one or more desired baler operations.

In another exemplary embodiment formed in accordance with the present invention, there is provided an agricultural baler towable by a vehicle. The vehicle has a vehicle hydraulic system. The agricultural baler includes a frame and a baler hydraulic system supported by the frame. The baler hydraulic system includes a plurality of hydraulically operated subsystems, a plurality of hydraulic subsystem lines being fluidly connected to the plurality of hydraulically operated subsystems, and a hydraulic manifold fluidly connected to the plurality of hydraulic subsystem lines and configured for connecting to the vehicle hydraulic system. The agricultural baler also includes an electrical processing circuit operably connected to the hydraulic manifold. The electrical processing circuit is configured for switching the hydraulic manifold for connecting at least one hydraulic subsystem line of the plurality of hydraulic subsystem lines to the vehicle hydraulic system.

In yet another exemplary embodiment formed in accordance with the present invention, there is provided a method for operating an agricultural baler towable by a vehicle. The method includes an initial step of providing a baler hydraulic system comprising a plurality of hydraulically operated subsystems, a plurality of hydraulic subsystem lines being fluidly connected to the plurality of hydraulically operated subsystems, and a hydraulic manifold fluidly connected to the plurality of hydraulic subsystem lines and configured for connecting to a vehicle hydraulic system of the vehicle. The method further includes providing an electrical processing circuit operably connected to the hydraulic manifold. The method further includes selecting at least one hydraulically operated subsystem. The method further includes switching the hydraulic manifold, by the electrical processing circuit, for connecting at least one hydraulic subsystem line of the plurality of hydraulic subsystem lines to the vehicle hydraulic system for operating the at least one hydraulically operated subsystem.

One possible advantage of the exemplary embodiment of the agricultural baler is that the hydraulic manifold hydraulically connects the baler to the towing vehicle through the use of only two hydraulic remotes while still maintaining the operational functionality of the multiple subsystems of the baler.

Another possible advantage of the exemplary embodiment of the agricultural baler is that the hydraulic manifold streamlines the hydraulic connection between the baler and the towing vehicle by reducing the number of requisite fluid lines.

Another possible advantage of the exemplary embodiment of the agricultural baler is that the hydraulic manifold automatically fluid connects the various hydraulically operated subsystems to the hydraulic system of the towing vehicle, thereby reducing the amount of manual intervention required to operate the baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 4 illustrates the switching procedure of the hydraulic manifold of FIGS. 2-3;

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting. As used herein, the phrases cycling of the tail gate or tail gate cycle may refer a cycle of movement of the tail gate wherein the tail gate is moved from closed-to-open-to-closed. The automatic cleaning of the knife trays may occur at any desired number of cycles of the tail gate, such as every 1 to 15 tail gate cycles.

Figure 1:
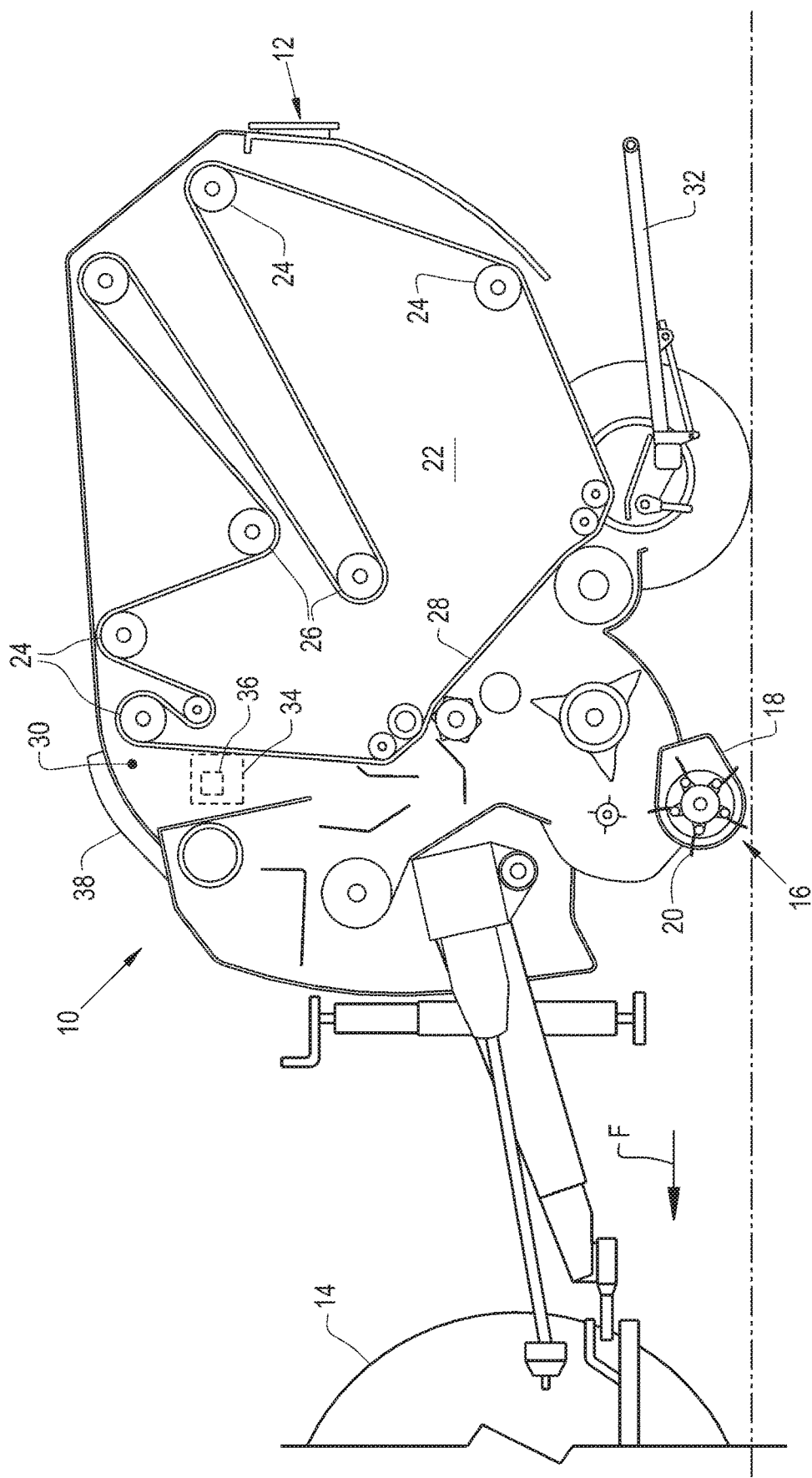
FIG. 1 illustrates a side cross-sectional view of an agricultural round baler, in accordance with an exemplary embodiment of the present invention.

Referring now to the drawings, and more particularly to FIG. 1, there is shown a cross-sectional, side view of a round baler 10 which may be towed by a vehicle 14 in a forward direction of travel F. The vehicle 14 may be any desired vehicle, such as an agricultural vehicle in the form of a tractor 14.

Crop material is lifted from windrows into the baler 10 by a pickup unit 16. The pickup unit 16 includes a rotating pickup reel 18 with tine bars and tines 20, which move the crop rearward toward a variable bale chamber 22. The reel 18 is rotatable in an operating direction for lifting the crop material off of the ground and a reverse direction, i.e., opposite to the operating direction.

The bale chamber 22 is configured as a variable bale chamber 22 which includes multiple rolls or rollers 24, 26, such as various stationary rollers 24 and movable rollers 26, actuators and pivot arms coupled to the movable rollers 26, and at least one belt 28. The rollers 24, 26 may comprise a floor roller, starter roller, fixed roller(s), pivot roller(s), stripper roller, and/or follower roller(s). Together, the rollers 24, 26 and the belt(s) 28 create a round circulating chamber which expands in between an empty bale position and a full bale position for engaging and rolling the bale. As the bale grows inside the chamber 22 it begins to act upon the belts 28 such that the belts 28 pull against the pivot arms which in turn causes the movable rollers 26 to move upwardly so that the variable bale chamber 22 incrementally expands with the size of the bale.

When the bale reaches a predetermined size, the bale is wrapped with a wrapping material (e.g., mesh or twine) by a wrapper. Then, once fully wrapped, the bale is ejected out of the tail gate 12. The tail gate 12 may pivot upwardly about pivot axis 30 to open the bale chamber 22. Then, the bale rolls out of the bale chamber 22 and onto a bale ejector or kicker 32, which pushes the bale rearwardly away from the baler 10 so that the tail gate 12 may downwardly pivot unencumbered by the ejected bale.

The baler 10 can further include an electrical processing circuit 34, e.g. controller 34 with a memory 36, for conducting various baling procedures. For instance, the controller 34 can be configured for carrying out the bale discharge operation. Hence, the controller 34 may open the tail gate 12 via accompanying actuators upon sensing a full bale condition by a bale-size sensor (not shown).

Figure 2:
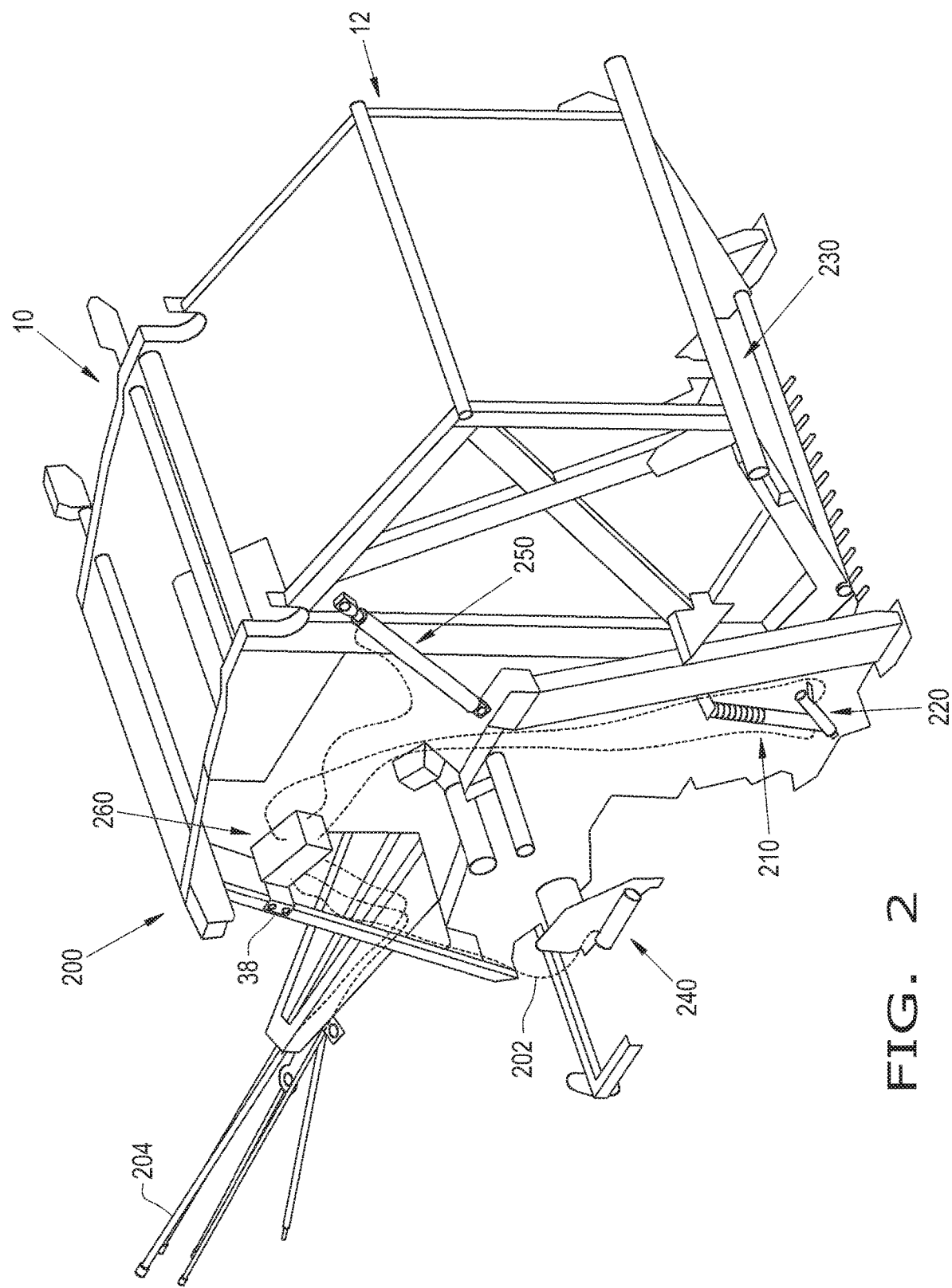
FIG. 2 illustrates a perspective view of the agricultural round baler of FIG. 1, the agricultural round baler including a hydraulic system.
Figure 3:
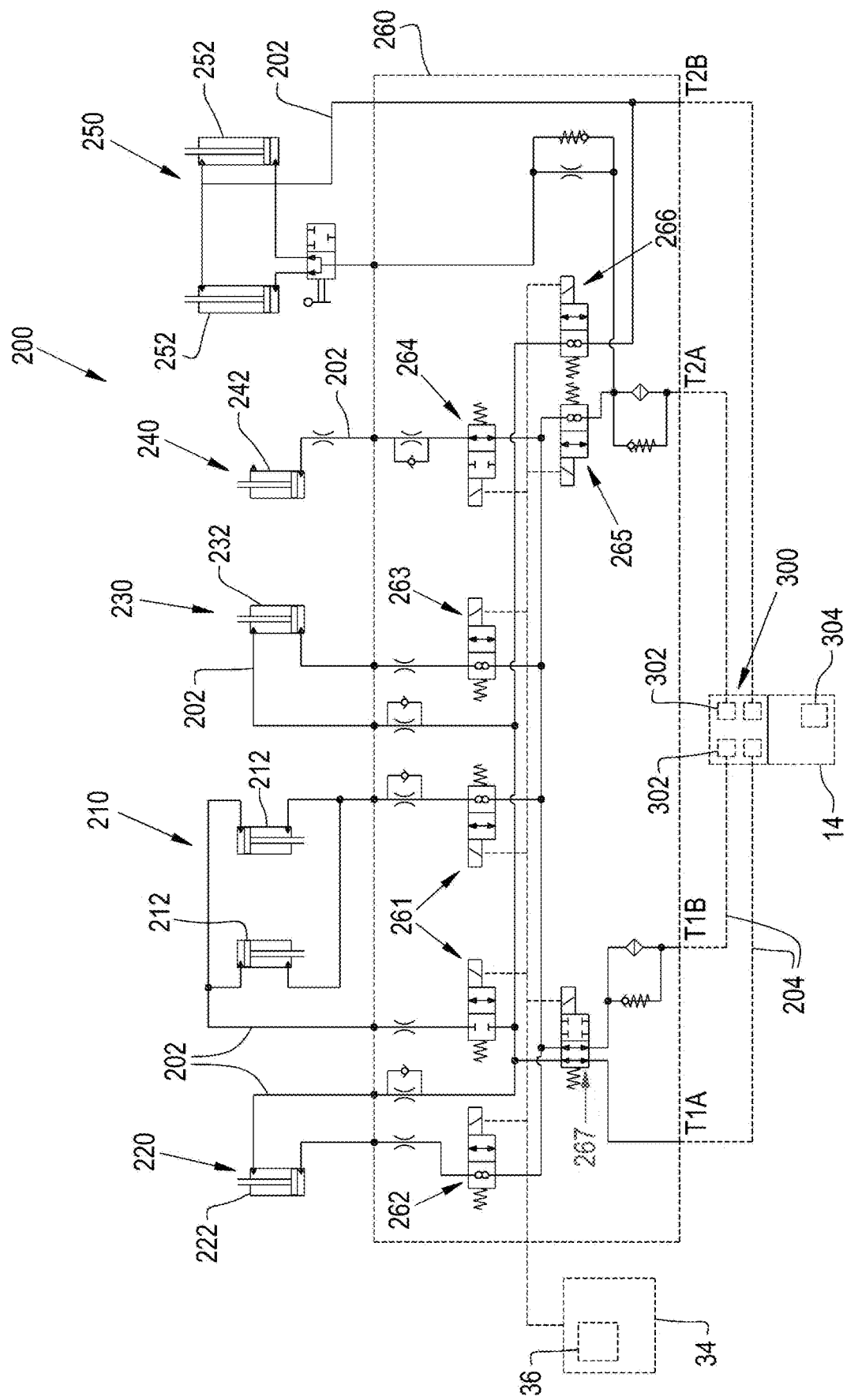
FIG. 3 illustrates a schematic view of the hydraulic system of FIG. 2, the hydraulic system including a two-line hydraulic manifold.

Referring now collectively to FIGS. 2-3, there is shown a hydraulic system 200 of the baler 10. The hydraulic system 200 may be supported by a frame 38 of the baler 10. The hydraulic system 200 may generally include multiple hydraulically operated subsystems 210, 220, 230, 240, 250, various hydraulic lines including subsystem lines 202 and tractor output lines 204, and a combination hydraulic manifold 260 fluidly connected in between the hydraulically operated subsystems 210, 220, 230, 240, 250 of the baler 10 and the hydraulic system 300 of the tractor 14 via the hydraulic lines 202, 204. Advantageously, the hydraulic manifold 260 operably couples a greater number of hydraulically operated subsystems 210, 220, 230, 240, 250, via the hydraulic subsystem lines 202 thereof, with a lesser number of hydraulic ports 302 of the vehicle hydraulic system 300. For example, the baler 10 may include five or more hydraulic subsystem lines 202 and the tractor 14 may only include four hydraulic ports 302, and thus, the sole hydraulic manifold 260 streamlines the hydraulic connection between the baler 10 and the tractor 14 by combining and selectively choosing which hydraulically operated subsystem or subsystems 210, 220, 230, 240, 250 are hydraulically coupled with the tractor 14 at a given time.

The hydraulic subsystem lines 202 fluidly connect the hydraulically operated subsystems 210, 220, 230, 240, 250 to the hydraulic manifold 260. The hydraulic subsystem lines 202 may include a drop floor line, a first knife tray line, a second knife tray line, a pickup unit line, and a tail gate line. The hydraulic output lines 204, i.e., hydraulic manifold-to-tractor lines 204, fluidly connect the hydraulic manifold 260 to the hydraulic ports 302 of the vehicle hydraulic system 300 (FIG. 3). The hydraulic subsystem lines 202 associated with each hydraulically operated subsystem 210, 220, 230, 240, 250 outnumber the hydraulic manifold-to-tractor lines 204. The hydraulic lines 202, 204 may be in the form of any desired fluid lines. For example, the hydraulic lines 202, 204 may comprise any desired hydraulic hoses, tubes, and/or fittings.

The hydraulically operated subsystems 210, 220, 230, 240, 250 may include a drop floor subsystem 210, a first knife tray subsystem 220, a second knife tray subsystem 230, a pickup unit subsystem 240, and a tail gate subsystem 250. Each subsystem 210, 220, 230, 240, 250 may include one or more hydraulic cylinders 212, 222, 232, 242, 252 for operating the drop floor, the first knife tray, the second knife tray, the pickup unit 16, and the tail gate 12, respectively. The hydraulic cylinders 212, 222, 232, 242, 252 may be in the form of any desired actuators. The hydraulic cylinders 212, 222, 232, 242, 252 may be double acting or single acting cylinders.

The hydraulic manifold 260 is fluidly connected in between the hydraulically operated subsystems 210, 220, 230, 240, 250 and the tractor 14. The hydraulic manifold 260 is the only manifold which connects the hydraulic subsystem lines 202 to the tractor 14. Hence, the hydraulic manifold 260 is a combination hydraulic manifold 260 since it combines and hydraulically connects a number of hydraulic lines 202 of the subsystems 210, 220, 230, 240, 250 with the tractor 14. The hydraulic manifold 260 may include variously configured valves, such as directional valves, solenoid valves, check valves, etc., filters, line restrictions, and fluid lines. For instance, the hydraulic manifold 260 may include a pair of drop floor solenoid valves 261 operably connected to the cylinders 212 the drop floor subsystem 210, a first knife tray solenoid valve 262 operably connected to the cylinder 222 of the first knife tray subsystem 220, a second knife tray solenoid valve 263 operably connected to the cylinder 232 of the second knife tray subsystem 230, a pickup unit solenoid valve 264 operably connected to the cylinder 242 of the pickup unit subsystem 240, a pair of two-way solenoid valves 265, 266 associated with the cylinders 252 of the tail gate subsystem 250, and a four-way solenoid valve 267. The valves 261, 262, 263, 264, 265, 266, 267 may be in the form of any desired valves, such as solenoid operated hydraulic cartridge valves. The hydraulic manifold 260 may also include two lines including four tractor ports T1A, T1B, T2A, T2B for accommodating the remotes of the tractor 14. It should be appreciated that the hydraulic manifold 260 may include any desired combination of the solenoid valves to jointly or respectively accommodate one or more of the hydraulically operated subsystems 210, 220, 230, 240, 250.

The controller 34 is operably connected to the hydraulic manifold 260 for switching the hydraulic manifold 260 in order to connect one or more hydraulic subsystem lines 202 of one or more hydraulically operated subsystems 210, 220, 230, 240, 250 to the hydraulic system 300 of the tractor 14. In more detail, the controller 34 is operably connected to each solenoid valve 261, 262, 263, 264, 265, 266, 267 for switching the solenoid valves 261, 262, 263, 264, 265, 266, 267 in order to achieve one or more desired baler operations. It should be appreciated that the controller 34 may be incorporated as part of the baler 10 and/or tractor 14.

Referring now to FIG. 4, there is shown a chart of the switch combinations for the hydraulic manifold 260 during certain baler operations. As depicted in FIG. 4, an "X" represents which port is pressurized in relation to the tractor ports T1A, T1B, T2A, T2B of the first and second remotes, and an "X" also represents which solenoid valve 261, 262, 263, 264, 265, 266, 267 is presently energized throughout the various baler operations. The operator may choose between four separate functions or baler operations, and the controller 34 may accordingly energize corresponding solenoid valves 261, 262, 263, 264, 265, 266, 267 to achieve the selected baler operation(s). For instance, the operator may select the pickup unit 16, the first knife tray, and/or the second knife try to be operated. In the case of operating the pickup unit 16 during default operation, the pickup unit solenoid valve 264 may not be energized. Also, in the default operational mode for tail gate 12, the two-way solenoid valves 265, 266 may not be energized. As a further development of the present invention, upon the operator selecting a particular baler operation, the controller 34 may automatically energize certain solenoid valves 261, 262, 263, 264, 265, 266, 267 associated with another hydraulically operated subsystem 210, 220, 230, 240, 250. For example, the controller may automatically retract the first and/or second knife trays upon the operator choosing to lower the drop floor. Hence, two hydraulically operated subsystems 210, 220, 230, 240, 250 may be operated at one time. Furthermore, in a service mode, the knife tray solenoid valves 262, 263, the drop floor solenoid valves 261, and the solenoid valves 265, 266, 267 may all be energized. Additionally, in a road or transport mode, the controller 34 may only energize the pickup unit solenoid valve 264 so that the pickup unit 16 is lifted and all other baler operations are halted. In essence, the transport mode locks out the pickup unit cylinder 242 and prevents the operation of the other hydraulically operated subsystems 210, 220, 230, 240, 250. As can be appreciated, the hydraulic system 200 may need to be switched back to its default mode for pickup operation once the transport mode has been terminated. Also, in an automatic knife tray cleanout procedure, the controller 34 may energize the solenoid valves 262, 263 of the first and/or second knife trays to move the knives and accordingly dislodge and remove debris therefrom. It is noted that the controller 34 may determine whether the knife trays are retracted before opening the tail gate 12 and accordingly conducting the knife tray cleanout procedure. The controller 34 may also automatically return to the previously selected baler operation after the tail gate 12 opens and closes. As can be appreciated, any combination of pressurizing the tractor ports T1A, T1B, T2A, T2B and energizing the solenoid valves 261, 262, 263, 264, 265, 266, 267 is conceivable to achieve one or more desired baler operations.

Figure 5:
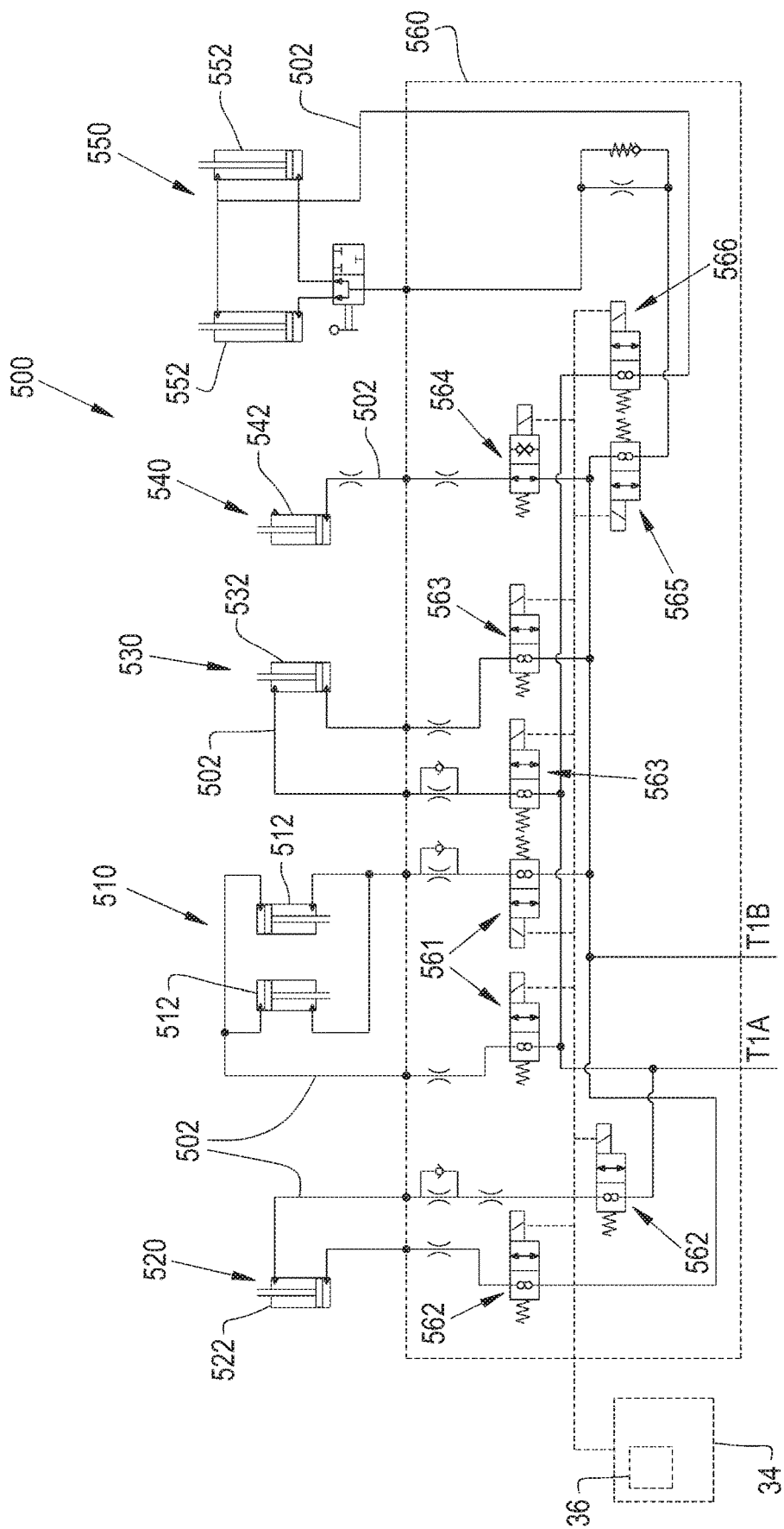
FIG. 5 illustrates a schematic view of another embodiment of a hydraulic system, the hydraulic system including a single-line hydraulic manifold, in accordance with an exemplary embodiment of the present invention.

Referring now to FIG. 5, there is shown another embodiment of a hydraulic system 500 with a single-line hydraulic manifold 560. The hydraulic system 500 may be similar to the hydraulic system 200, except that the hydraulic manifold 560 includes a single line with two tractor ports T1A, T1B and paired solenoid valves 561, 562, 563, 565, 566. Like elements between the hydraulic systems 200, 500 have been identified with like reference characters except for the 500 series designation. Hence, the hydraulic system 500 may generally include multiple hydraulically operated subsystems 510, 520, 530, 540, 550, various hydraulic lines including subsystem lines 502 and tractor output lines, and a combination hydraulic manifold 560 fluidly connected in between the hydraulically operated subsystems 510, 520, 530, 540, 550 of the baler 10 and the hydraulic system 300 of the tractor 14.

Additionally, the controller 34 may be configured with further software to automatically control the various switching positions of the hydraulic manifold 560. The controller 34 may energize a set of respective solenoid valves 561, 562, 563, 565, 566 for operating the corresponding hydraulically operated subsystem 510, 520, 530, 550 to achieve the desired baler operation. For example, to engage or disengage the first knife tray of the first knife tray subsystem 520, the controller 34 may energize both of the first knife tray solenoid valves 562. To perform multiple baler operations at a given time, the controller 34 may energize multiple solenoid valves 561, 562, 563, 564, 565, 566 at the same time. However, as can be appreciated, any combination of pressurizing the tractor ports T1A, T1B and energizing the solenoid valves 561, 562, 563, 564, 565, 566 is conceivable to achieve one or more desired baler operations.

Figure 6:
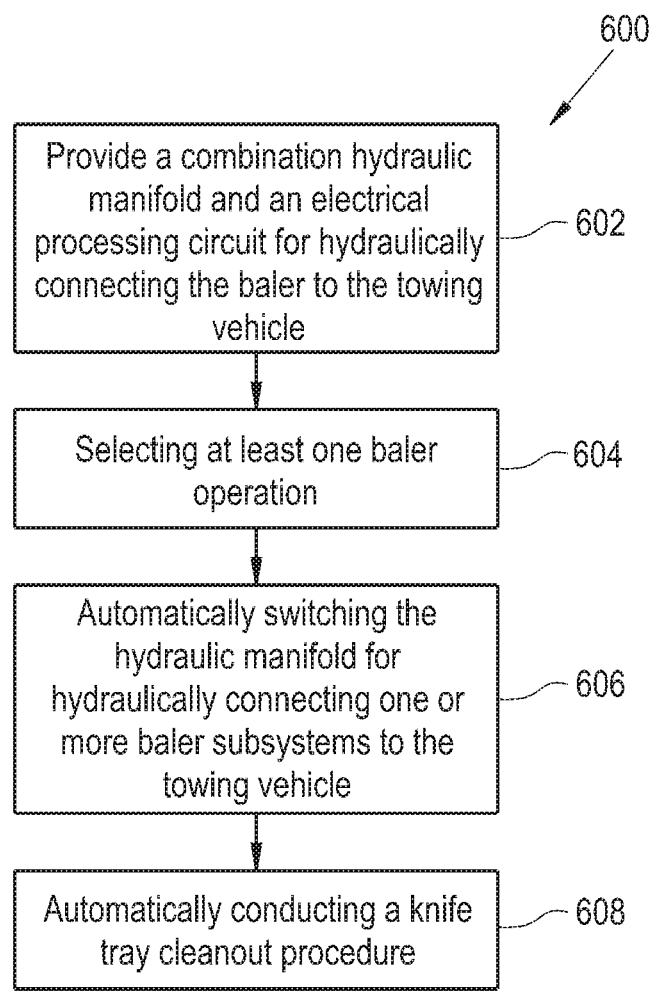
FIG. 6 illustrates a flow chart of a method for operating the agricultural round baler.

Referring now to FIG. 6, there is shown a flow chart of a method 600 for operating the agricultural baler 10. The method 600 may include the initial step of providing the controller 34 and either hydraulic system 200, 500, with its respective hydraulic manifold 260, 560, as described above (at block 602). Yet, by way of example only, the method 600 is described herein with respect to the hydraulic system 200. The method 600 may also include a step of selecting one or more baler operations, e.g. subsystem functions or modes (at block 604). It should be appreciated that selecting one or more baler operations may be synonymous with selecting one or more hydraulically operated subsystems 210, 220, 230, 240, 250 for performing the associated baler operation (s). The selection of one or more baler operations may occur via the operator inputting an input command into the user interface 304 and/or the controller 34 automatically selecting the baler operation(s) based upon various sensed and/or preprogramed parameters within the memory 36. Once the desired baler operation is selected, the controller 34 may automatically switch one or more of the solenoid valves 261, 262, 263, 264, 265, 266, 267 of the hydraulic manifold 260 for fluidly connecting one or more hydraulic subsystem lines 202 to the hydraulic system 300 of the tractor 14 in order to operate the desired subsystem(s) 210, 220, 230, 240, 250 (at block 606). The method 600 may further include a step of automatically conducting a knife tray cleanout procedure to clean the first and/or second knifes by automatically operating the first and/or second knife tray subsystems 220, 230, via the controller 24 energizing the corresponding solenoid valves 262, 263, upon a cycling of the tail gate subsystem 250 (at block 608). The method 600 may also include selecting a desired mode and automatically switching the hydraulic manifold 260 by the controller 34. For example, the operator may select a service mode or a transport mode and the controller 34 may automatically switch one or more solenoid valves 261, 262, 263, 264, 265, 266, 267 of the hydraulic manifold 260 to position the baler 10 in the transport or service mode.

It is to be understood that the method 600 and the operation of either hydraulic system 200, 500 may be performed by the controller 34 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 34 described herein is implemented in software code or instructions which are tangibly stored on a tangible computer readable medium. The controller 34 loads the software code or instructions via a direct interface with the computer readable medium or via a wired and/or wireless network. Upon loading and executing such software code or instructions by the controller 34, the controller 34 may perform any of the functionality of the controller 34 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural baler towable by a vehicle comprising a vehicle hydraulic system, the agricultural baler comprising:
    a frame;
    a baler hydraulic system supported by the frame, comprising:
        a plurality of hydraulically operated subsystems;
        a plurality of hydraulic subsystem lines being fluidly connected to the plurality of hydraulically operated subsystems; and
        a hydraulic manifold fluidly connected to the plurality of hydraulic subsystem lines and configured for connecting to the vehicle hydraulic system; and
    an electrical processing circuit operably connected to the hydraulic manifold and configured for switching the hydraulic manifold for connecting at least one hydraulic subsystem line of the plurality of hydraulic subsystem lines to the vehicle hydraulic system, wherein the hydraulic manifold comprises a plurality of solenoid valves connected to the plurality of hydraulic subsystem lines, and each solenoid valve being associated with a respective hydraulically operated subsystem of the plurality of hydraulically operated subsystems, the electrical processing circuit being operably connected to the plurality of solenoid valves and configured for switching the plurality of solenoid valves for operating at least one hydraulically operated subsystem of the plurality of hydraulically operated subsystems, wherein the plurality of hydraulically operated subsystems includes a drop floor subsystem, a first knife tray subsystem, a second knife tray subsystem, a pickup unit subsystem, and a tail gate subsystem, the electrical processing circuit being configured for automatically cleaning out at least one of the first knife tray subsystem and the second knife tray subsystem upon a cycling of the tail gate subsystem.

2. The agricultural baler of claim 1, wherein the hydraulic manifold is the only hydraulic manifold for operatively connecting the plurality of hydraulic subsystem lines to the vehicle hydraulic system.

3. The agricultural baler of claim 1, wherein the baler hydraulic system further comprises a plurality of hydraulic manifold-to-tractor lines configured for connecting the hydraulic manifold to a plurality of hydraulic ports of the vehicle hydraulic system, and wherein the plurality of hydraulic subsystem lines outnumbers the plurality of hydraulic manifold-to-tractor lines.

4. The agricultural baler of claim 1, wherein the plurality of hydraulic subsystem lines comprises a drop floor line, a first knife tray line, a second knife tray line, a pickup unit line, and a tail gate line.

5. The agricultural baler of claim 1, wherein the electrical processing circuit is configured for switching the plurality of solenoid valves for operating at least one of the plurality of hydraulically operated subsystems upon receiving an input command from a user.

6. An agricultural baler towable by a vehicle comprising a vehicle hydraulic system, the agricultural baler comprising:
    a frame;
    a baler hydraulic system supported by the frame, comprising:
        a plurality of hydraulically operated subsystems;

a plurality of hydraulic subsystem lines being fluidly connected to the plurality of hydraulically operated subsystems; and a hydraulic manifold fluidly connected to the plurality of hydraulic subsystem lines and configured for connecting to the vehicle hydraulic system; and an electrical processing circuit operably connected to the hydraulic manifold and configured for switching the hydraulic manifold for connecting at least one hydraulic subsystem line of the plurality of hydraulic subsystem lines to the vehicle hydraulic system, wherein the electrical processing circuit is configured for automatically switching the hydraulic manifold in a transport mode for transporting the agricultural baler.

7. A method for operating an agricultural baler towable by a vehicle, comprising:

providing a baler hydraulic system comprising a plurality of hydraulically operated subsystems, a plurality of hydraulic subsystem lines being fluidly connected to the plurality of hydraulically operated subsystems, and a hydraulic manifold fluidly connected to the plurality of hydraulic subsystem lines and configured for connecting to a vehicle hydraulic system of the vehicle, and further providing an electrical processing circuit operably connected to the hydraulic manifold;

selecting at least one hydraulically operated subsystem for operation thereof;

switching the hydraulic manifold, by the electrical processing circuit, for connecting at least one hydraulic subsystem line of the plurality of hydraulic subsystem lines to the vehicle hydraulic system for operating the at least one hydraulically operated subsystem, wherein the hydraulic manifold includes a plurality of solenoid valves connected to the plurality of hydraulic subsystem lines, and each solenoid valve being associated with a respective hydraulically operated subsystem of the plurality of hydraulically operated subsystems, the electrical processing circuit being operably connected to the plurality of solenoid valves, and the step of switching the hydraulic manifold includes switching the plurality of solenoid valves, by the electrical processing circuit, for operating at least one hydraulically operated subsystem of the plurality of hydraulically operated subsystems, wherein the plurality of hydraulically operated subsystems comprises a drop floor subsystem, a first knife tray subsystem, a second knife tray subsystem, a pickup unit subsystem, and a tail gate subsystem; and automatically cleaning at least one of the first knife tray subsystem and the second knife tray subsystem, by the electrical processing circuit, upon a cycling of the tail gate subsystem.

8. The method of claim 7, wherein the hydraulic manifold is the only hydraulic manifold for operatively connecting the plurality of hydraulic subsystem lines to the vehicle hydraulic system.

9. The method of claim 7, wherein the baler hydraulic system further comprises a plurality of hydraulic manifold-to-tractor lines configured for connecting the hydraulic manifold to a plurality of hydraulic ports of the vehicle hydraulic system, and wherein the plurality of hydraulic subsystem lines outnumbers the plurality of hydraulic manifold-to-tractor lines.

10. The method of claim 7, wherein the plurality of hydraulic subsystem lines comprises a drop floor line, a first knife tray line, a second knife tray line, a pickup unit line, and a tail gate line.

11. The method of claim 7, wherein the step of selecting at least one hydraulically operated subsystem comprises a user selecting the at least one hydraulically operated subsystem from a user interface for inputting an input command, and the step of switching the hydraulic manifold comprises the electrical processing circuit automatically switching the plurality of solenoid valves for operating the at least one hydraulically operated subsystem upon receiving the input command.

12. The method of claim 7, further comprising a step of automatically switching the hydraulic manifold in a transport mode, by the electrical processing circuit, for transporting the agricultural baler.

* * * * *